FIG.1

Oct. 11, 1927.                                            1,644,714
C. P. EISENHAUER
WATER SOFTENING APPARATUS
Filed July 27, 1925           6 Sheets-Sheet 3

INVENTOR
CHARLES P. EISENHAUER
BY
ATTORNEYS

Oct. 11, 1927.

C. P. EISENHAUER 1,644,714

WATER SOFTENING APPARATUS

Filed July 27, 1925    6 Sheets-Sheet 5

INVENTOR
CHARLES P. EISENHAUER
BY Taulmin & Taulmin
ATTORNEYS

Patented Oct. 11, 1927.

1,644,714

UNITED STATES PATENT OFFICE.

CHARLES P. EISENHAUER, OF DAYTON, OHIO, ASSIGNOR TO THE DURO COMPANY, OF DAYTON, OHIO, A CORPORATION OF OHIO.

WATER-SOFTENING APPARATUS.

Application filed July 27, 1925. Serial No. 46,291.

My invention relates to semi-automatic water softening apparatus.

It is the object of my invention to provide a semi-automatic water softening apparatus which may be converted from softening to regenerating action and position or vice versa, by a single movement of an electric switch or lever.

It is a further object to provide for such control remotely from the apparatus as in the kitchen of a house when the apparatus is located in the cellar.

It is a further object to provide such an apparatus which will automatically soften the water and recharge the salt tank with water during the softening period and, when the switch or lever is operated, will automatically reverse the direction of the water through the softening material down a drain drawing salt water from the salt tank, through the softening tank and out the drain, shutting off the salt water and flushing the tank of this salt through the drain and, during this period, automatically by-pass hard water to the service lines of the house or building.

Referring to the drawings.

Figure 1:
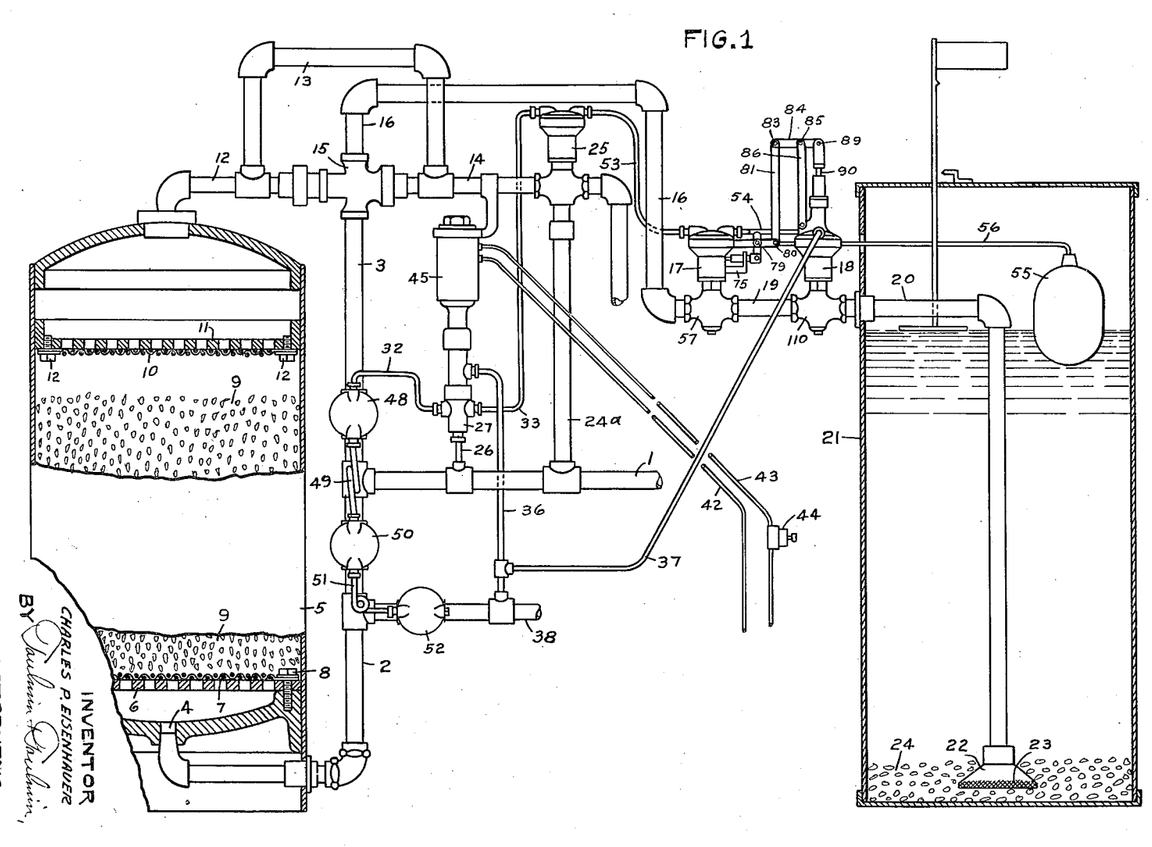
Figure 1 is a side elevation of the complete system, using a remote control, an electric switch, with a softening tank partially in section, and the brine tank in section.

Referring to the drawings in detail, 1 is an incoming hard water line, which is branched into two pipes consisting of a lower softening tank 2 and an upper softening tank 3. The lower tank pipe 2 enters at 4 at the bottom of the softening tank 5 beneath the grating 6 over which is mounted a screen 7. The grating and screen are held in position by the bolts 8. Water softening material 9 is located between this screen 7 and an upper screen 10 which is carried beneath a grating 11, held into position by the bolts 12. The top of this softening tank 5 has connected to it the upper end of the pipe 3, which is designated 12. A full volume by-pass line 13 is connected to 12 and to the service line 14. Between these points of connection is an injector mechanism in the fitting 15. One side of this fitting is connected to pipe 3, the other side to the pipe 12, a third side to the pipe 14 and a fourth side to the brine line 16. This brine line 16 carries a refill valve 17 and a brine valve 18. These valves are connected by a section of the brine line marked 19. On the other side of the brine valve is a pipe 20 located in the salt tank 21 which terminates in a bell 22 having a screen 23, the mouth of such bell with the screen being located in a gravel bed 24.

The main line 1 has a by-pass line 24ª connected to the service line with a by-pass valve 25.

Figures 2, 3:
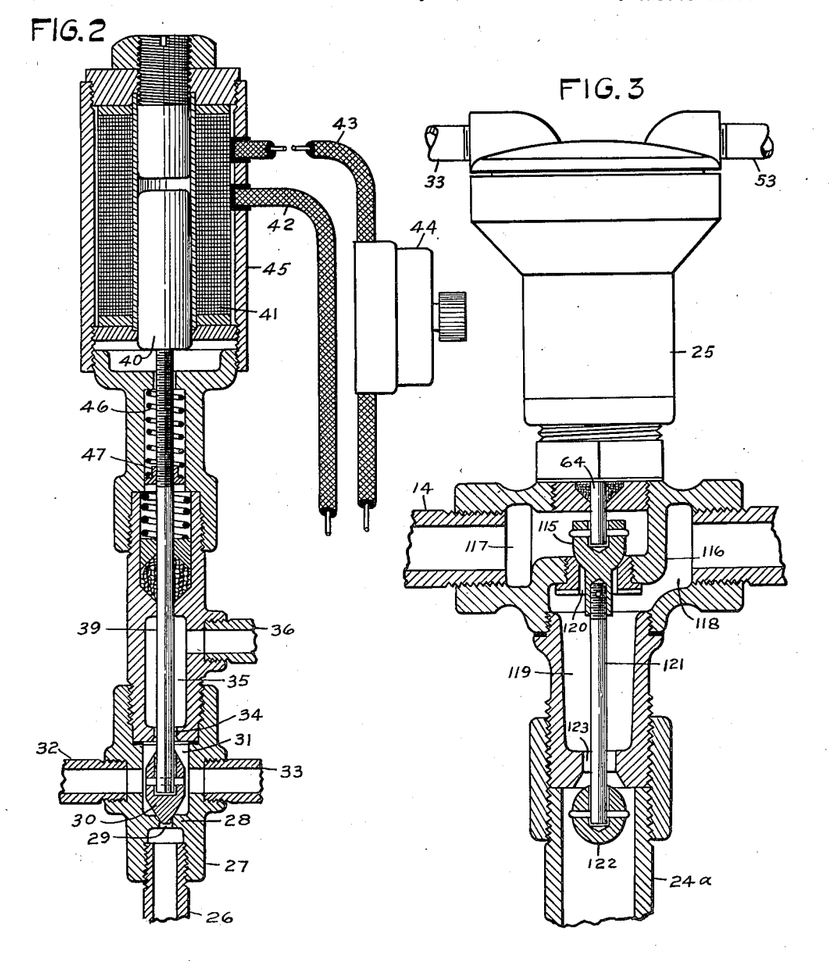
Figure 2 is a section through the electrically operated needle control valve.
Figure 3 is an elevation partially in section of the by-pass valve.

Connected to the main line 1 is a pipe 26 leading to the bottom of the casing 27 of the needle control valve. This casing contains a partition 28 having an aperture 29 which is adapted to be closed by a valve member 30 which shuts off access to a chamber 31 from which lead the pipes 32 and 33 conveying hydrostatic pressure to operate the valves controlling the system. The upper end of this chamber 31 communicates through a passageway 34 to a chamber 35 which is connected to a drain line 36. This drain line is also connected to a drain line 37, which are both connected to the main drain pipe 38 which is, in turn, connected to the lower pipe 2 leading to the bottom of the softening tank.

The valve member 30 is adapted to alternately close the passageway leading from the pipe 26 to the chamber 31, and from the chamber 31 to the pipe 36. When it is up, the hard water passes into the pipes 32 and 33 to operate the valves for regeneration of the system; whereas, when it is down, the surplus pressure in the valves can be drained back through the pipe 36 through the opening 34. The valve member 30 is operated by a valve stem 39, the upper end of which is connected to an armature 40 of a solenoid 41. The solenoid 41 is connected to a pair of wires 42 and 43 which are, in turn, connected to the switch 44 and to a source of current of any desired character. The solenoid is located within a casing 45 which is screwed on top of the control valve casing. The valve stem 39 is moved in the other direction by a spring 46, one end of which abuts against a shoulder on the casing and the other end against a shoulder 47 on the valve stem.

The switch 44 is customarily located in the kitchen, while the apparatus is located in the cellar, so that when the water becomes hard, turning of the switch will enable the person operating the system to regenerate it, and upon regeneration being completed in a pre-determined time, the switch can be turned again so that softened water can be secured once more.

When the switch is turned, the solenoid serves to lift the needle valve, admitting pressure through the pipe 32 to the valve 48 opening that valve and opening the line 3. This pressure is carried from that valve through a pipe 49 to the valve 50, closing that valve and shutting off the hard water passing to the bottom of the softening tank. The pressure then passes from the valve 50 through the pipe 51 to the drain valve 52 opening the drain valve in the drain line 38. The pressure admitted by the control valve also passes through the pipe 33 opening the by-pass valve 25 to allow hard water to pass into the service line during the period of regeneration. The pressure passes from the by-pass valve 25 through the line 53 to the refill valve 17 which is open and which is locked open by its lock, hereinafter described. The pressure passes by this valve through the pipe 54 to the brine valve 18 which it does not operate until the float 55 with its float arm 56 descends to a pre-determined point, so that the brine valve will be opened to close the brine line and prevent further delivery of brine, due to the action of the injector 15. The water continues to run through the softening tank from the top to the bottom to flush it out of salt, then the switch is turned or the lever operated, the hydrostatic pressure is cut off from the valves and the yielding means in the valves returns the valves to initial softening position. This relief of pressure in the brine valve allows it to open. The refill valve is still locked open so that a portion of the water now being softened is delivered to the salt tank until the float lifts to its original position, at which time the lock is pulled on the refill valve causing it to close, preventing further replenishment of the salt tank with fresh water.

Figure 6:
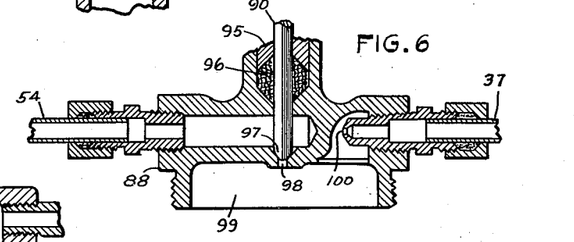
Figure 6 is a section through the top of the brine valve.

This refill valve is described as follows:—
The pipe 16 enters the fitting 57 into a chamber 58. A second chamber 59 is provided in this fitting separated from the chamber 58 by a partition 60 which has a valve seat 61 around an aperture 62. This valve seat is adapted to receive the valve member 63 on the valve stem 64. This valve stem is surrounded by a packing 65, washer 66 and a spring 67, held in the cage 68. This washer is contained within a threaded sleeve 69 on which is threaded the valve casing of the valve 17. This casing has a piston 70 threaded on the valve stem and connected to the diaphragm 71. This diaphragm is held in position by the threaded cap 72 which encloses the diaphragm chamber 73 with which the pipes 53 and 54 communicate. A locking plunger 74 is provided to engage with the piston to lock the valve open. This plunger is guided by the bracket 75 and is forced inwardly by the spring 76 mounted thereon. The free end of the plunger is connected to a bell crank having arms 77 and 78 pivoted at 79. This bell crank is connected to the float arm 56. The free end of the arm 78 is pivoted at 80 to a link 81 having a slot 82 in which works a pin 83. This pin is carried by a rocking arm 84 pivoted at 85 on a supporting link 86. This supporting link is pivoted at 87 on the top casing 88 of the brine valve 18. The free end of the rocking arm 84 is pivoted at 89 to the valve stem 90. This valve stem carries a shoulder 91 which supports a spring 92 at one end, the other end of which abuts against the inside of the tubular casing 93. This tubular casing is provided with the usual spring packing arrangement consisting of a spring 94, a packing washer 95 and a packing 96. This needle valve stem 90 has a needle point 97 closing an aperture 98, thus controlling the passage of hydrostatic pressure, as will be seen in Figure 6, from the pipe 54 into the diaphragm chamber 99. Leading from this diaphragm chamber is a drain pipe 37 which has a small lead opening 100. The diaphragm 101 is actuated by the pressure behind it, thus actuating a valve stem 102 which has a spring 103 working it in the opposite direction, thus carrying with it the piston 104 towards the valve seat. The valve stem carries a valve member 105 adapted to sit on an aperture 106 in the partition 107 between the chambers 108 and 109 in the fitting 110.

Figure 5:
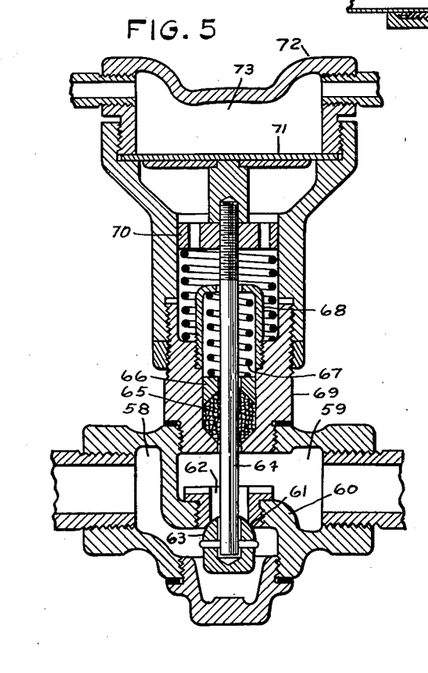
Figure 5 is a section through a typical control valve.
Figures 8, 9:
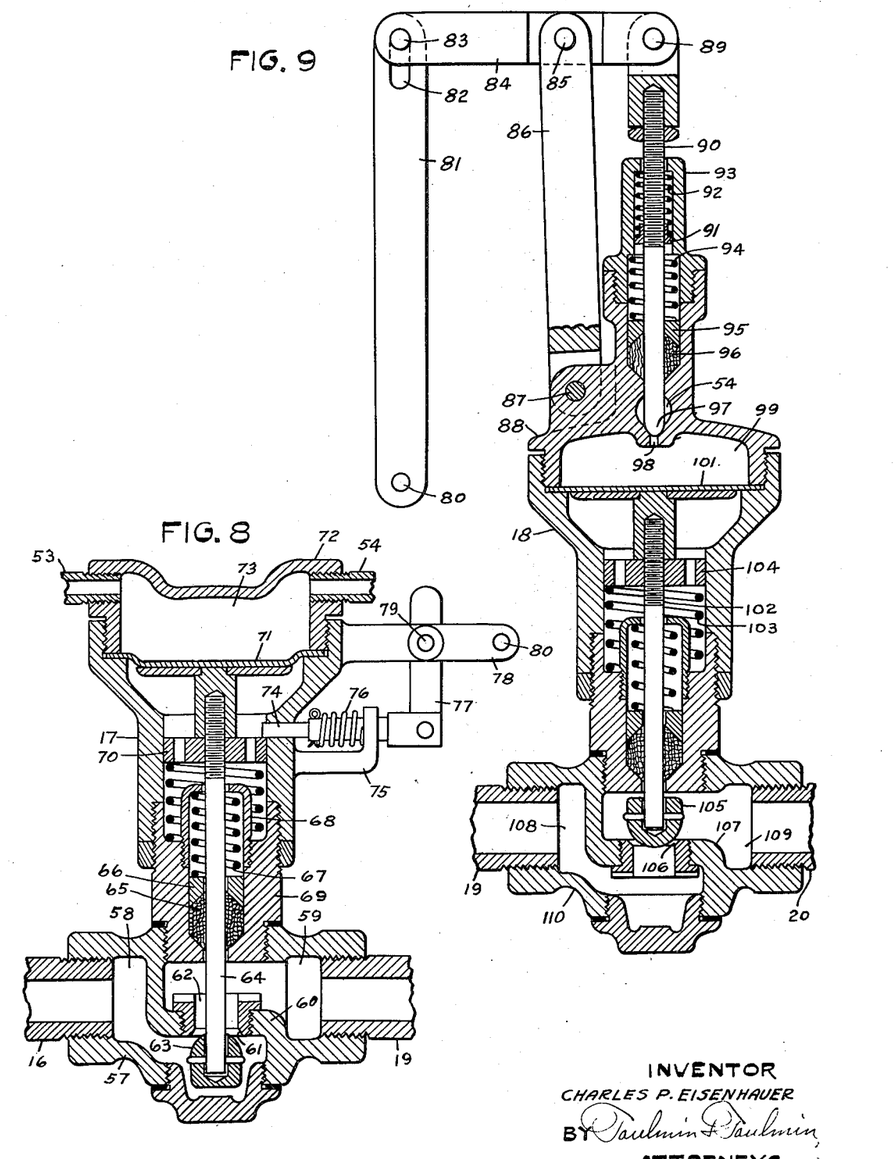
Figure 8 is a section through the refill valve.
Figure 9 is a section through the brine valve.

A typical valve will be seen in Figure 5, the construction of which is similar to that shown in Figure 8 save that there is no lock. This valve shown in Figure 5 is that valve similar in construction to the valve in the valve position marked 48 and 52. The valve used at 50 has a reverse movement in that the valve member is above the partition instead of below, so that when the pressure is applied, the valve is closed rather than open.

Figure 4:
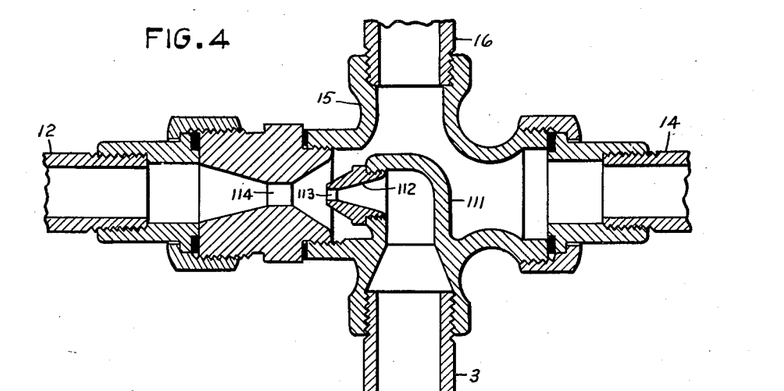
Figure 4 is a section through the injector.

Turning to the injector mechanism, the pipe 3 is introduced into an inwardly projecting injector nozzle 111 which terminates at right angles in a restricted nozzle 112 having an opening 113 which is adjacent to, but separated from a restricted passage way 114 leading into the pipe 12.

Turning to the bypass valve, it will be noted that the usual valve stem 64, the rest of the valve being like that in Figure 8, without the lock, carries a valve member 115 which sits on the usual partition 116. This partition separates the chamber 117 from the chamber 118. The latter communicates with a by-pass chamber 119 on one side and with a service line pipe on the other. A passageway 120 is closed by the valve member 115 between the chambers 117, 118 and 119. This valve member 115 carries a supplementary valve stem 121 which supports on its lower end a valve member 122 adapted to close an opening 123 from the pipe 24ᵃ into the by-pass valve chamber 119. Thus, when the passageway is open between the chamber 117 to the chamber 118, the communication between the chambers 118 and 117 to the pipe 24ᵃ is closed.

Figure 10:
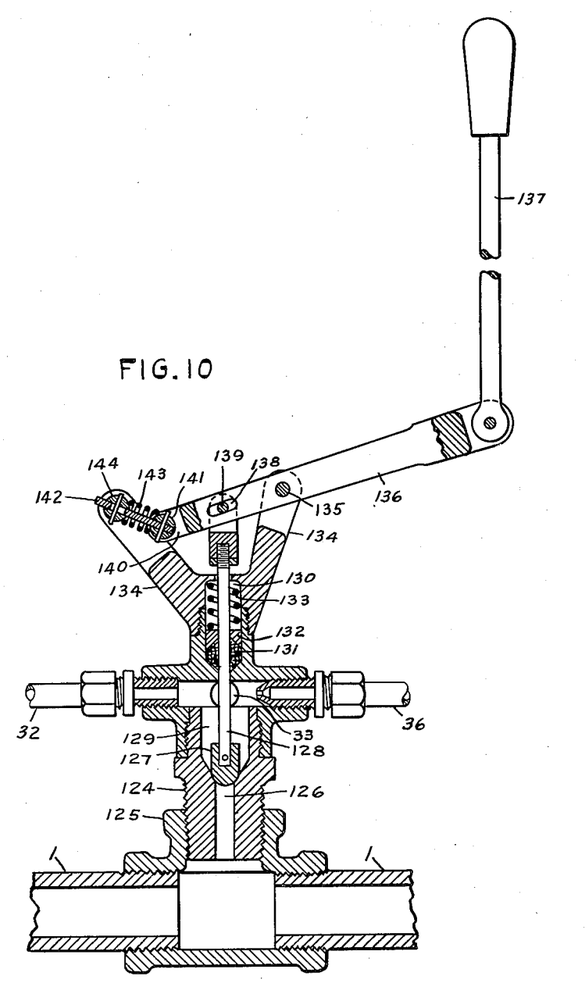
Figure 10 is a section through the mechanically operated needle control valve, which is preferably operated by the remote control shown.

Referring to Figure 10 and the mechanically operated control valve, it will be observed that a tubular casing 124 is threaded into a fitting 125 on the pipe 1. The passageway 126 through this tubular member is closed by a valve member 127 on a valve stem 128. The passageway 126 leads to a chamber 129 from which lead the pipes 36, 32 and 33. A stuffing chamber 130 is provided around the valve stem at its upper end in which is located a packing 131, a packing washer 132 and a retaining spring 133. The upper end of this casing is provided with a pair of arms 134, one of which carries an arm 136. This arm 136 is connected by a link 137 to a remote point as in the kitchen. This arm 136 is provided with a slot 138 in which works a pin 139 carried on the upper end of the valve 128. The free end of the lever 136 carries a pair of jaws 140. Between these jaws is a pivotally mounted pin 141 carrying a link 142 around which is placed a spring 143. This spring abuts against another transverse pin 144 which slidably carries the link 142, so that a toggle joint is formed by the lever 136 and the link 142, thus holding the valve open or closed, as may be desired.

Operation.

When the switch is turned, after softening has taken place, the valve 48 is opened by the needle valve, allowing the hydrostatic pressure to enter behind this valve. The valve 50 is closed, the drain valve 52 is open and the water passes up through the pipe 3 to the injector 15 through the pipe 12 downwardly through the softener and out the drain 38. The injector draws salt water from the salt tank. The by-pass valve is open so that the valve member 115 is closed and the valve member 122 is open.

Figure 7:
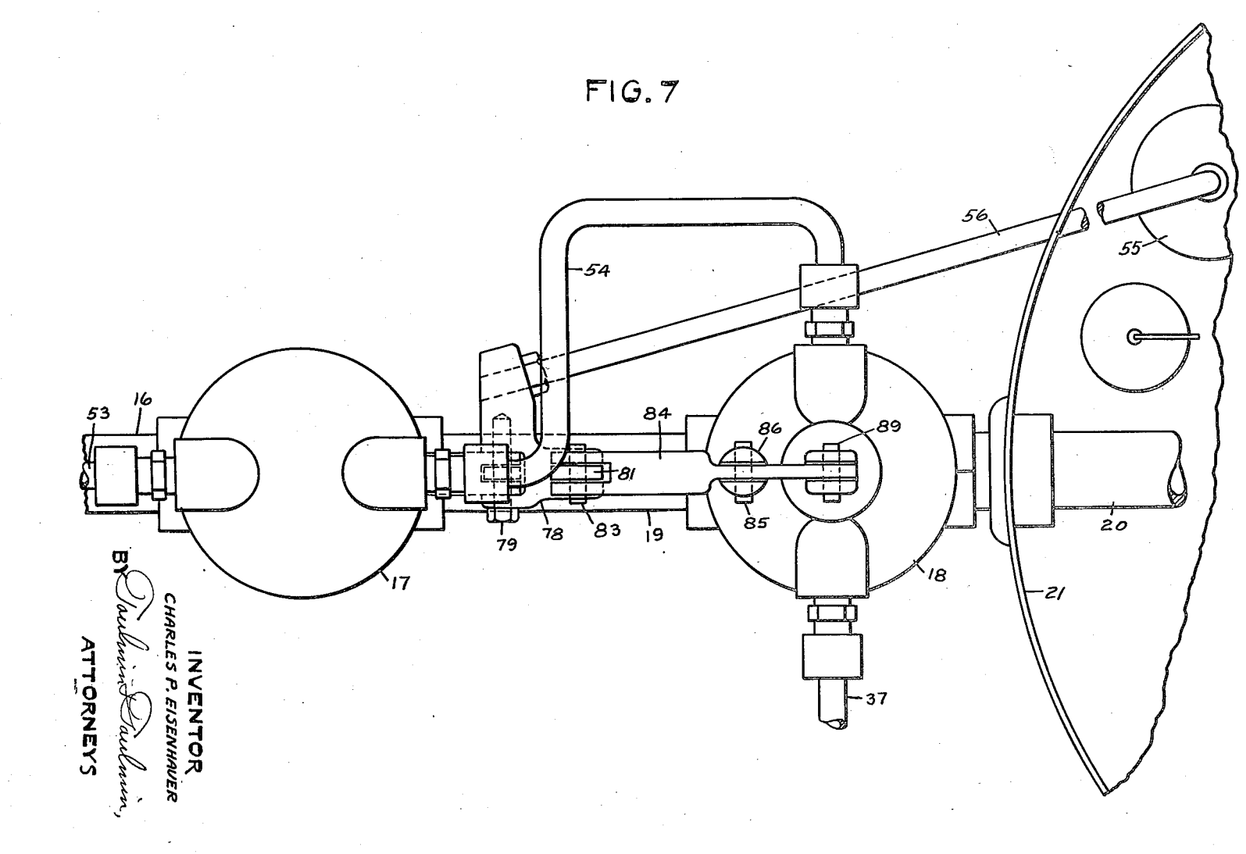
Figure 7 is a plan view of the refill and brine valves.

Due to the fact that the pressure is behind the diaphragm of the refill valve, the diaphragm is depressed, the valve is opened and locked open by the locking plunger 74. The brine valve is normally open so that the brine can be taken from the tank at the bottom. When the float drops down sufficiently with the float arm 56, the pin 83 gets to the end of the slot 82 and pulls down on the lever 84 lifting it at 89, opening the passageway 98 allowing the pressure to get behind the diaphragm 101, thus closing the brine valve and stopping a further flow of brine, so that the remaining water which passes through the system flushes out the softening tank.

When the switch is again turned, the valves are reversed to their former position, save that the refill and brine valves are still open, allowing a part of the water to pass through the brine line 16 through the softening tank to replenish it. The fresh water passes through the softening tank so it will not be impeded in its flow by the injector mechanism 15. This water continues to flow to the salt tank until the float and float arm rises, pulling the locking plunger 74 allowing the refill valve to close.

It will be understood that I desire to comprehend within my invention such modifications as may be necessary to adapt it to varying conditions and uses.

Having thus fully described my invention, what I claim as new and desire to secure by Letters Patent, is:—

1. In a water softening apparatus, a container for a softening means, a container for regenerating means, means to deliver regenerating material to the softening means, means to deliver hard water to the softening means and to take softened water therefrom, a plurality of valves to control the alternate periods of regenerating and softening, a master control valve therefor, a means to control said master control valve, said means being remote from the system.

2. In a water softening apparatus, a container for a softening means, a container for regenerating means, means to deliver regenerating material to the softening means, means to deliver hard water to the softening means and to take softened water therefrom, a plurality of valves to control the alternate periods of regenerating and softening, a master control valve therefor, a means to control said master control valve, said means being remote from the system, said means to control said master control valve consisting of electrical means connected to a source of electrical current.

3. In a water softening apparatus, a container for a softening means, a container for regenerating means, means to deliver regenerating material to the softening means, means to deliver hard water to the softening means and to take softened water therefrom, a plurality of valves to control the alternate periods of regenerating and softening, a master control valve therefor, a means to control said master control valve, said means being remote from the system, said means to control said master control valve consisting of remotely located mechanical means.

4. In a water softening apparatus, a container for a softening means, a container for regenerating means, means to deliver regenerating material to the softening means, means to deliver hard water to the softening means and to take softened water therefrom, a plurality of valves to control the alternate periods of regenerating and softening, a master control valve therefor, a means to control said master control valve, said means being remote from the system, said means to control said master control valve consisting of remotely located mechanical means, and means to maintain said master control valve in either opened or closed position.

5. In a water softening apparatus, an incoming hard water line, lines leading to either end of the softening tank, a softening tank containing softening material, a brine tank, a line leading from the brine tank to the softening tank, a refill valve, a brine valve, a drain line, valves controlling the line to the top of the softening tank to the bottom of the softening tank and to the drain, a master control valve adapted to admit hydrostatic pressure to said several valves to operate them, and hand control electric means for operating said master control valve at desired intervals.

6. In a water softening apparatus, an incoming hard water line, lines leading to either end of the softening tank, a softening tank containing softening material, a brine tank, a line leading from the brine tank to the softening tank, a refill valve, a brine valve, a drain line, valves controlling the line to the top of the softening tank to the bottom of the softening tank and to the drain, a master control valve adapted to admit hydrostatic pressure to said several valves to operate them, and hand controlled electric means for operating said master control valve at desired intervals, a float and float arm in said brine tank, a lock on said refill valve adapted to be controlled thereby and a needle valve adapted to control the application of said hydrostatic pressure to said brine valve, whereby the amount of brine being extracted from the brine tank and the amount of fresh water redelivered thereto will be controlled.

7. In a water softening apparatus, an incoming hard water line, lines leading to either end of the softening tank, a softening tank containing softening material, a brine tank, a line leading from the brine tank to the softening tank, a refill valve, a brine valve, a drain line, valves controlling the line to the top of the softening tank to the bottom of the softening tank and to the drain, a master control valve adapted to admit hydrostatic pressure to said several valves to operate them, and hand controlled electric means for operating said master control valve at desired intervals, a float and float arm in said brine tank, a lock on said refill valve adapted to be controlled thereby and a needle valve adapted to control the application of said hydrostatic pressure to said brine valve whereby the amount of brine being extracted from the brine tank and the amount of fresh water redelivered thereto will be controlled, and means to draw the brine from the brine tank connected to the incoming hard water line.

8. In a water softening apparatus, an incoming hard water line, lines leading to either end of the softening tank, a softening tank containing softening material, a brine tank, a line leading from the brine tank to the softening tank, a refill valve, a brine valve, a drain line, valves controlling the line to the top of the softening tank to the bottom of the softening tank and to the drain, a master control valve adapted to admit hydrostatic pressure to said several valves to operate them, and hand controlled electric means for operating said master control valve at desired intervals, a float and float arm in said brine tank, a lock on said refill valve adapted to be controlled thereby and a needle valve adapted to control the application of said hydrostatic pressure to said brine valve whereby the amount of brine being extracted from the brine tank and the amount of fresh water redelivered thereto will be controlled, and means to draw the brine from the brine tank connected to the incoming hard water line, and a by-pass line around said means to provide means for the flow of softened water, during the softening operation, around said means.

9. In a water softening apparatus, an incoming hard water line, lines leading to either end of the softening tank, a softening tank containing softening material, a brine tank, a line leading from the brine tank to the softening tank, a refill valve, a brine valve, a drain line, valves controlling the line to the top of the softening tank to the bottom of the softening tank and to the drain, a master control valve adapted to admit hydrostatic pressure to said several valves to operate them, and hand controlled electric means for operating said master control valve at desired intervals, a float and float arm in said brine tank, a lock on said refill valve adapted to be controlled thereby and a needle valve adapted to control the application of said hydrostatic pressure to said brine valve whereby the amount of brine being extracted from the brine tank and the amount of fresh water redelivered thereto will be controlled, and means to draw the brine from the brine tank connected to the incoming hard water line, and a by-pass line around said means to provide means for the flow of softened water, during the softening operation, around said means, a by-pass line between the incoming hard water line and the service line, and a valve adapted to control the passage of water directly from the incoming hard water line to the service line during regeneration and adapted to close the line from the softening tank to the service line, such valve being hydrostatically operated like the remainder of the valves.

10. In a water softening apparatus, a softening tank having softening means therein, a brine tank having brine therein, an incoming hard water line leading to the top and bottom of the softening tank, a brine line connected to the top line leading to the top of the softening tank, an injector means at the junction thereof, a drain line connected to the bottom line of the softening tank, a refill valve and a brine valve in the brine line, a valve controlling the line leading to the top of the softening tank, to the bottom of the softening tank, a drain valve, a needle controlled valve connected to the incoming hard water line and to said respective valves for communicating pressure therefrom, a drain line connected to said valve for draining said valves to the main drain line, means to lock said refill valve open, a float connected to said lock and to a needle valve to control application of hydrostatic pressure to the brine valve, a master control valve, a solenoid therefor, and an electric circuit connected thereto and a remote switch for closing the circuit to energize said solenoid.

11. In a water softening apparatus, a softening tank having softening means therein, a brine tank having brine therein, an incoming hard water line leading to the top and bottom of the softening tank, a brine line connected to the top line leading to the top of the softening tank, an injector means at the junction thereof, a drain line connected to the bottom line of the softening tank, a refill valve and a brine valve in the brine line, a valve controlling the line leading to the top of the softening tank, to the bottom of the softening tank, a drain valve, a needle control valve connected to the incoming hard water line and to said respective valves for communicating pressure therefrom, a drain line connected to said valve for draining said valves to the main drain line, means to lock said refill valve open, a float connected to said lock and to a needle valve to control the application of hydrostatic pressure to the brine valve, a master control valve, a solenoid therefor, and an electric circuit connected thereto, and a remote switch for closing the circuit to energize said solenoid, a by-pass line from an incoming hard water line to the service-line, a valve hydrostatically controlled from the master control valve, adapted during regeneration to close the connection between the top of the softening tank and the service line, and to open the connection directly from the incoming hard water line to the service line.

12. In a water softening apparatus having softening means and regenerating means, means to supply hard water to said softening means, valves for controlling the alternate softening of water and the regenerating of the softening means, hydrostatic valves for effecting the alternate application of hard water to the softening material to be softened, and a regenerating material for regenerating the softening material, means for conveying hydrostatic pressure thereto from the incoming hard water line, and electrically-operated means adapted to operate a master control valve for controlling the application of this hydrostatic pressure.

In testimony whereof, I affix my signature.

CHARLES P. EISENHAUER.